United States Patent

[11] 3,540,361

[72] Inventor John C. Schira
Princeton, New Jersey
[21] Appl. No. 640,005
[22] Filed May 22, 1967
[45] Patented Nov. 17, 1970
[73] Assignee RCA Corporation
a coporation of Delaware
[32] Priority Aug. 16, 1966
[33] Great Britain
[31] 36,622/66

[54] OPTICAL FIELD CORRECTION DEVICES FOR AN ELECTRONIC PHOTOCOMPOSITION SYSTEM

2 Claims, 5 Drawing Figs.

[52] U.S. Cl. .......... 95/4.5
[51] Int. Cl. .......... B41b 19/06
[50] Field of Search .......... 95/4.5

[56] References Cited

UNITED STATES PATENTS 1,633,228 6/1927 Rogers .......... 355/67
1,953,471 4/1934 Eich .......... 355/83X
2,933,011 4/1960 Wick .......... 355/67X
2,989,909 6/1961 Reed .......... 355/20X
3,083,624 4/1963 Troup .......... 95/4.5
3,177,764 4/1965 Akima .......... 355/20

*Primary Examiner*—John M. Horan
*Attorney*—John V. Regan

ABSTRACT: An optical field correction device is incorporated into an electronic photocomposition system to correct for unequal transmission of light through a focusing lens. Different attenuations of light occur in a focusing lens depending upon the different angles the light rays make with the optical axis of the focusing lens. Such a lens is utilized in the photocomposition system to focus onto photographic film, patterns that are initially formed on an electronic display device, such as a cathode ray tube. The optical field correction device is made to exhibit a light transmission characteristic complementary to that of the focusing lens and is positioned in the photocomposition system so that, in combination with the lens, uniform transmission of light to the photographic film occurs.

INVENTOR
JOHN C. SCHIRA
BY John T. O'Halloran
ATTORNEY

OPTICAL FIELD CORRECTION DEVICES FOR AN ELECTRONIC PHOTOCOMPOSITION SYSTEM

BACKGROUND OF THE INVENTION

Electronic techniques of type composition are extremely fast when compared to mechanical and photographic type composition techniques. Furthermore, the electronic photocomposition technique also exhibits the additional advantages of providing automatic justification and hyphenation of the printed text material. In such electronic photocomposition machines, patterns including characters are formed upon the face of a cathode ray tube. Each character is formed by a plurality of scans of the scanning electron beam in the cathode ray tube. The turning on and off, as well as the scanning, of the electron beam is done under the control of an electronic data processor. The characters are formed in a line of type and are focused onto photographic film by a focusing lens. High gamma film is utilized so that sharp and distinct boundaries occur between the characters and the background area of the film. Since the focusing lens transmits light unevenly, with less transmission of light occuring the greater the angular deviation from the optical axis of the lens, the characters on the outer extremities of a line of type are lighter than the characters in the middle of the line and thus the line of type is uneven in density.

SUMMARY OF THE INVENTION

An electronic photocomposition system embodying the invention includes an imaging device having a face for displaying thereon patterns in the form of light. A focusing lens is positioned to intercept the light patterns for focusing the light patterns at a focal plane. The focusing lens exhibits a nonuniform light transmission characteristic for light intercepted at different angles to its optical axis. Photographic film is mounted at the focal plane of the lens to record the light patterns. Correction means are included in the photocomposition system to compensate for the nonuniform transmission of light through the lens.

DETAILED DESCRIPTION

Figure 1:
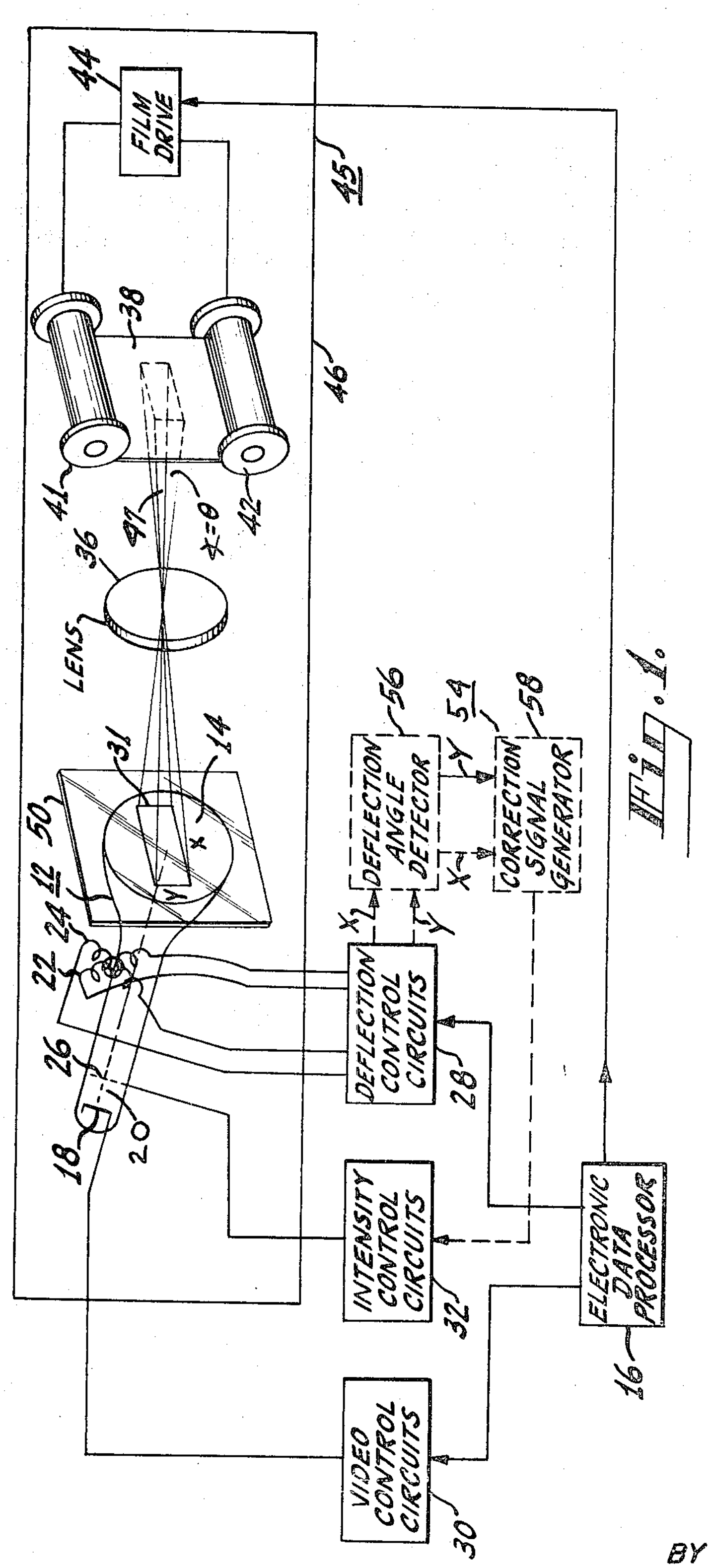
FIG. 1 is a block diagram of an electronic photocomposition system embodying the invention.

Referring now to FIG. 1, an electronic photocomposition system 10 includes an imaging device such as a cathode ray tube 12 having a face 14 for displaying patterns thereon. The patterns may for example comprise alphanumeric characters, line graphs, halftone pictures, etc. The patterns are formed under the control of an electronic data processor 16. The imaging device 12 also includes a cathode electrode 18 for emitting an electron beam 20 which is deflected by horizontal 22 and vertical 24 deflection coils. The intensity or amount of electrons in the electron beam 20 is controlled by a control grid 26. Deflection circuits 28 are coupled to the horizontal 22 and vertical 24 deflection coils of the tube 12 to control the deflection of the electron beam 20. The electronic data processor 16 activates the deflection circuits 28 to trace out patterns on the face 14 of the tube 12. Video control circuits 30 are coupled to the cathode 18 of the tube 12 to turn on and turn off the electron beam 20. The beam 20 is turned on only when patterns are to be traced on the face 14 of the tube 12, and turned off otherwise. The video control circuits 30 operate under the control of the electronic data processor 16. The video control circuits 30 in conjunction with the deflection control circuits 28 cause any particular patterns to be traced out in a scanning aperture or window 31 on the face 14 of the tube 12. The control grid 26 of the cathode ray tube 12 is coupled to intensity control circuits 32 that determine the intensity of the electron beam 20 in the tube 12. The video control circuits 30 in combination with the intensity control circuits 32 bias the tube 12 and thus determine the strength of the electron beam 20. The various other acceleration and focusing electrodes in the tube 12 are omitted because the cathode ray tube 12 comprises a standard type tube.

The patterns formed on the face 14 of the tube 12 are focused by a focusing lens, shown as a convex lens 36 in FIG. 1, onto photographic film 38. The photographic film 38 comprises high gamma photographic film. High gamma photographic film exhibits a density-to-exposure characteristic such as shown by the curve 39 in FIG. 2, whereas low gamma photographic film exhibits a characteristic such as shown by the curve 40 in the same graph. The photographic film 38 is mounted on reels 41 and 42 to position the film 38 in the focal plane of the lens 36. The reels 41 and 42 are rotated by a film drive motor 44. The drive motor 44 is coupled to be activated at the end of each line of type by the electronic data processor 16 so as to move to the next line position on the film 38. The optical subsystem portion 45 of the photocomposition system 10 is enclosed in a cassette 46 to prevent exposure to light of the film 38. The electronic photocomposition system 10 may for example comprise an RCA 70/820 Videocomp system presently available on the commercial market.

Figure 3:
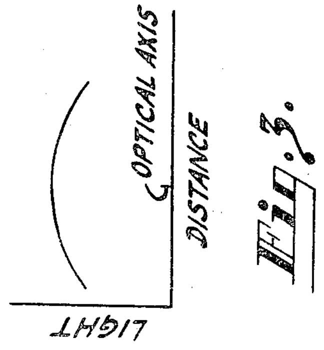
FIG. 3 is a graph illustrating the light transmission characteristics of a focusing lens utilized in the system of FIG. 1.

The lens 36 is positioned with relation to the tube 12 so that the center rest point or nondeflected position of the electron beam 20 lies along the optical axis 47 of the lens 36. The window 31 defines the area of the patterns formed on the tube 12. The patterns formed in the window 31 of the tube 12 lie in the object plane of the optical subsystem 45 and these patterns are focused onto the film 38 in the image plane of the lens 36. However, the patterns of light emanating from the tube 12 are not transmitted equally by the lens 36. As shown in FIG. 3, the light transmission characteristic of the lens 36 falls off from a peak at the center or optical axis of the lens 36 to lower values as the distance from the axis increases. This is because there is an attenuation of light that is a direct function of the fourth power of the angle $\theta$ that the impinging light makes with the optical axis 47 of the lens 36. The greater the angle $\theta$, the less light that is transmitted through the lens 36.

Figure 4:
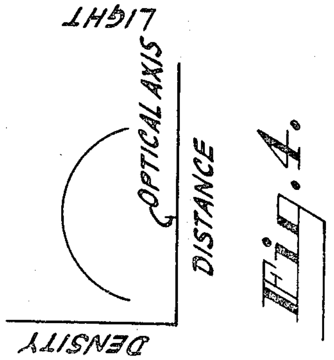
FIG. 4 is a graph illustrating the response to impinging light of the photographic film utilized in the system of FIG. 1.

The response of the photographic film 38 to such a light transmission characteristic is shown in FIG. 4. The density or response of the photographic film 38 falls off to a greater degree as the distance from the optical axis increases because of the high gamma characteristic of the film 38. Consequently, patterns further removed from the optical axis are lighter than those closer to this axis.

Figure 5:
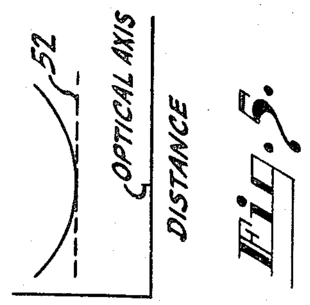
FIG. 5 is a graph illustrating the light transmission characteristics of an optical correction device incorporated in the system of FIG. 1.

One way of compensating for the different transmission of light through the lens 36 is by means of an optical field correction device or filter 50. The optical filter 50 functions as correction means for providing uniform light transmission to the film 38. The light transmission characteristic of the optical field correction filter 50 is shown in FIG. 5. It is to be noted that this light transmission characteristic is complementary to the light transmission characteristic of the lens 36 as shown in FIG. 3, and the combination of the two characteristics cause a uniform or a straight line transmission to the film 38 as shown by the dotted line 52 in FIG. 5.

Figure 2:
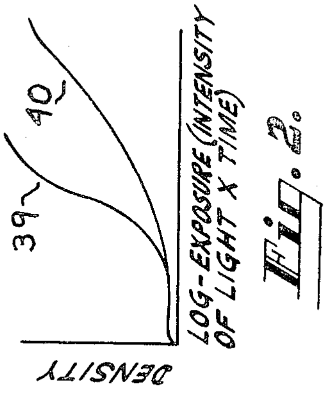
FIG. 2 is a graph illustrating the response to light exposure of low and high gamma photographic film.

The optical field correction filter 50 may for example originally comprise a neutral density filter made of ordinary commercial photographic film exhibiting a low gamma such as defined by the curve 40 in FIG. 2. The making of the optical field correction filter 50 comprises the steps of placing the low gamma photographic film at the image plane of the lens 36 (*i.e.* replacing the high gamma film 38 with low gamma film) and tracing a complete raster type scan across the entire window 31 of the cathode ray tube 12. Such scanning light is transmitted through the lens 36 to cause the light density on the low gamma film to be similar to that shown in FIG. 3. The low gamma film is then developed and a contact negative transparent print 50 is made from this developed film. The negative transparency 50 is made on low gamma photographic film and provides the complement of the light transmission character of the lens 36. The optical field correction filter 50 is positioned immediately adjacent the face 14 of the tube 12 so that the light emitted by the phosphor on the face 14 is transmitted through the filter 50. Alternatively, the filter 50 may be positioned immediately adjacent the photographic film 38. In any event the filter 50 should be positioned either in the object or image planes in the optical subsystem 45.

It is to be noted that when a scanning raster of the tube 12 is utilized in the making of a transparency 50 then the transparency 50 also compensates for the unequal generation of light by the tube 12. This unequal generation of light may be due to the unequal deposition of phosphor on the tube 12. Such a transparency 50 is then matched to compensate for both the lens 36 and the tube 12. Alternatively, a light source different from the tube 12 may be utilized to make the transparency 50, such as a floodlight source. In such a case, the transparency 50 corrects for the lens 36 but not for the tube 12.

In an electronic photocomposition system such as the system 10, the nonuniform light transmission characteristic of the lens 36 may also be compensated for by electronic correction means or circuits 54 and with the filter 50 removed. Since the combination of the scanning beam 20 and the phosphor on the face 14 of the tube 12 produce the patterns photographed by the film 38, the correction circuits 54 is designed to intensify the light emitted by the tube 12 as the scanning beam 20 increases its angle to the optical axis 47.

The correction circuits 54 include a deflection angle detector 56 coupled to the deflection control circuits 28 to detect the amount of deflection of the scanning beam 20 caused by the control circuits 28. The detector 56 measures the magnitude of the deflection signals applied to the deflection coils 22 and 24. A correction signal control generator 58 is coupled to the deflection angle detector 56 to generate a control signal proportional to the deflection angle of the scanning beam 20. The control signal is applied from the generator 58 to the intensity control circuits 32. The greater the amplitude of the control signal the more the control grid 26 is biased more positively (*e.g.* less negatively) with respect to the cathode electrode 18. Such a more positive bias increases the amount of electrons in the beam 20 and increases the light intensity on the outer extremities of the window 31. Thus when the lens 36 attenuates this more intense light, a substantially uniform transmission of light to the photographic film 38 is achieved.

Thus in accordance with the invention, an electronic photocomposition system is provided with correction means that automatically compensates for unequal transmission of light through the optical subsystem therein.

I claim:

1. An electronic photocomposition system comprising in combination:

a cathode ray tube display device having an electron beam for generating patterns in the form of light beams on the face thereof;

a focusing lens having an optical axis and positioned to intercept said light beams for focusing said light beams at a focal plane;

said focusing lens exhibiting a nonuniform light transmission characteristic for light beams intercepted at different angles to said optical axis;

photographic film mounted at said focal plane to intercept said light beams to record said patterns;

an optical field correction filter comprising a photographic film transparency exhibiting a light transmission characteristic complementary to the light transmission characteristic of said lens; and means for mounting said filter to attenuate said light beams to provide a uniform transmission of light from said patterns to said photographic film.

2. An electronic photocomposition system comprising in combination:

a cathode ray tube having an electron beam for generating patterns on the face thereof;

a control electrode for controlling the intensity of said electron beam;

a deflection circuit for deflecting said electron beam to trace out said patterns on the face of said cathode ray tube;

a focusing lens having an optical axis positioned to intercept said light patterns for focusing said light patterns at a focal plane;

said focusing lens exhibiting a nonuniform light transmission characteristic for light intercepted at different angles to said optical axis;

photographic film mounted at said focal plane to record said light patterns; and correction means for compensating for the nonuniform transmission of light through said lens, said correction means including, means for detecting the deflection angles of said electron beam to generate a control signal to bias said control electrode in a manner to increase the intensity of said electron beam as said deflection angles increase.